April 14, 1936.  W. A. EATON  2,037,505
STEERING MECHANISM
Filed July 10, 1935  2 Sheets-Sheet 1
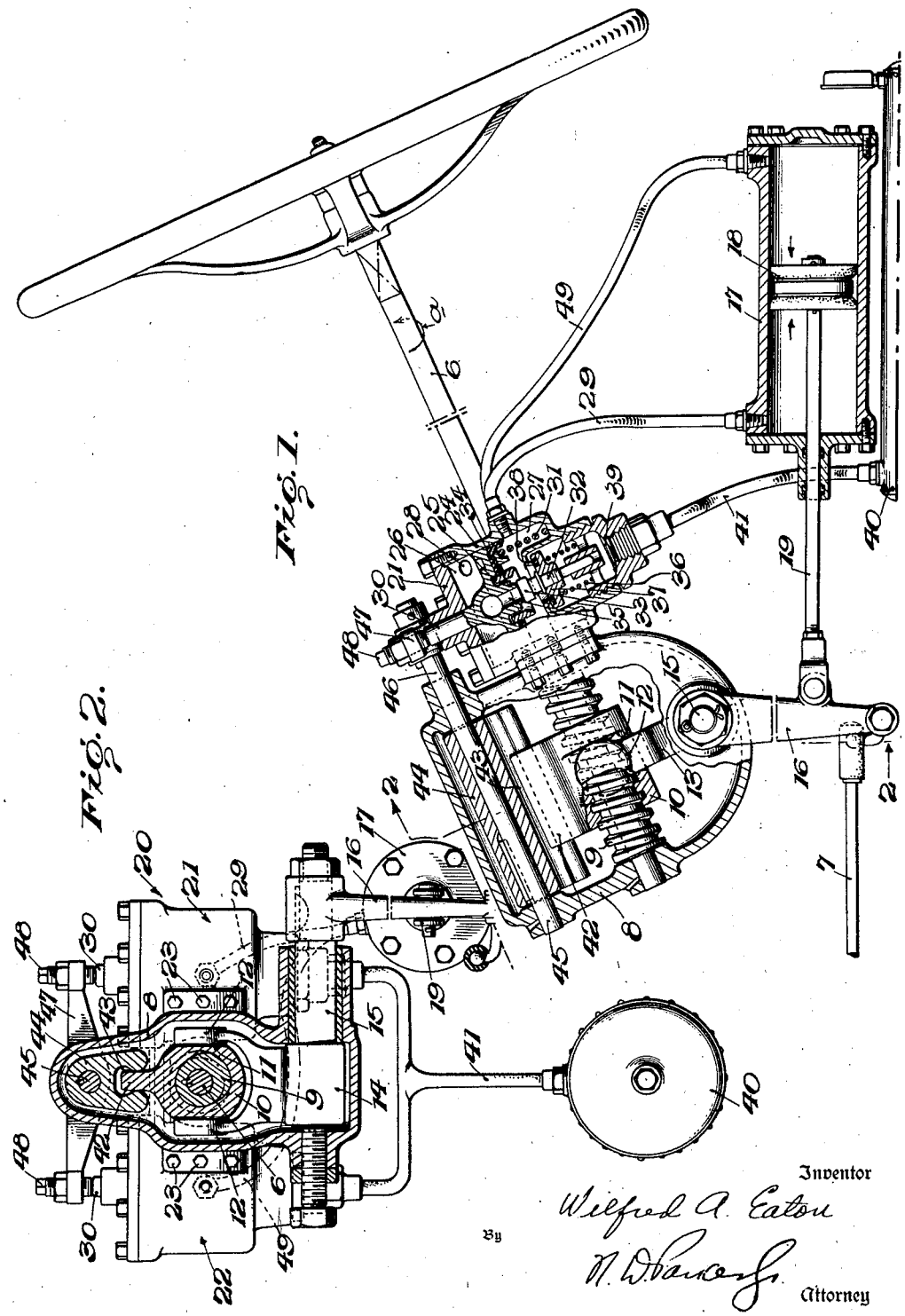

April 14, 1936. W. A. EATON 2,037,505
STEERING MECHANISM
Filed July 10, 1935 2 Sheets-Sheet 2
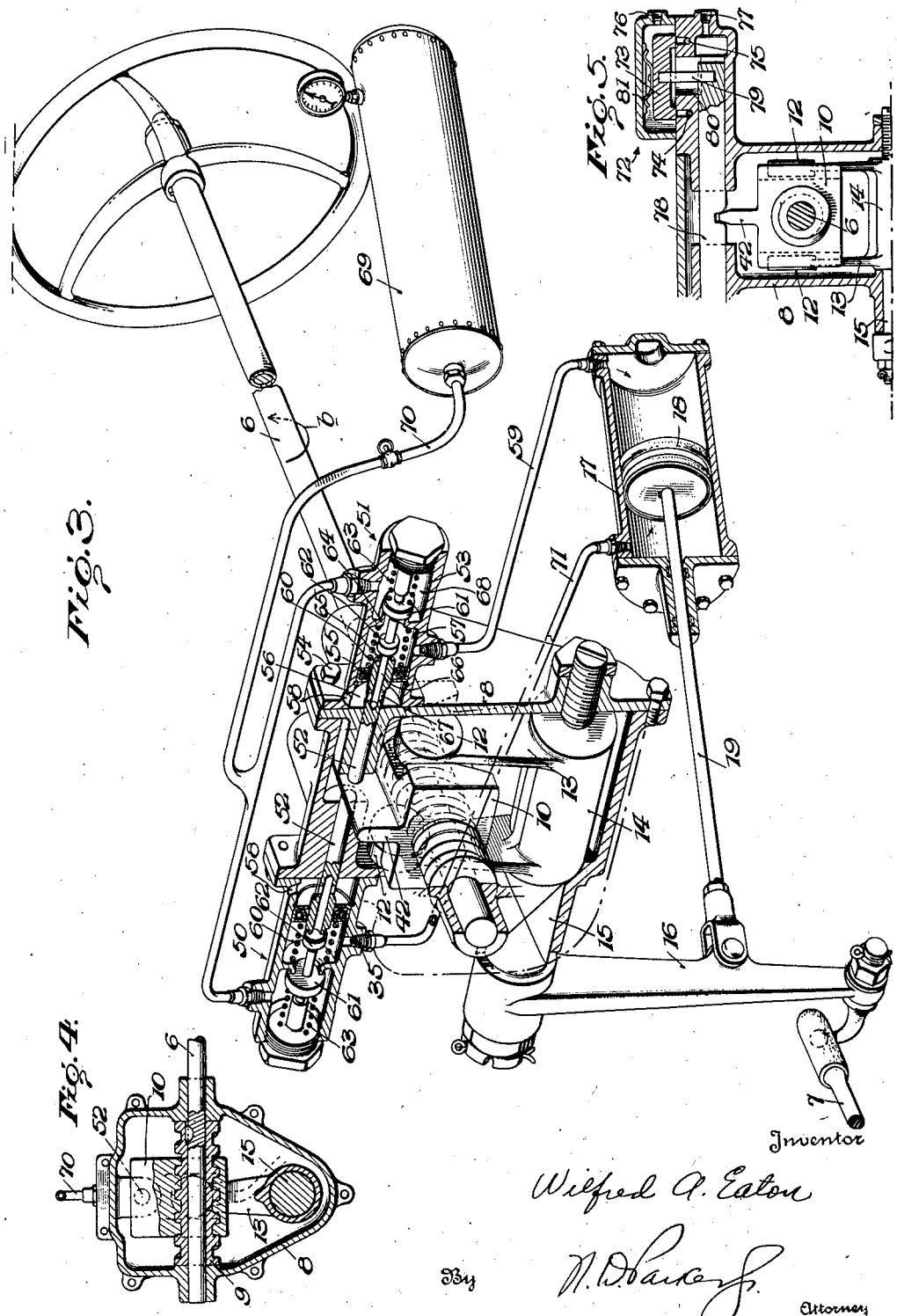

Patented Apr. 14, 1936

2,037,505

UNITED STATES PATENT OFFICE 2,037,505

STEERING MECHANISM

Wilfred A. Eaton, Pittsburgh, Pa., assignor to Bendix-Westinghouse Automotive Air Brake Company, Pittsburgh, Pa., a corporation of Delaware Application July 10, 1935, Serial No. 30,740

6 Claims. (Cl. 180—79.2)

This invention relates to a steering mechanism and more particularly to steering mechanisms of the power-operated type for use in connection with motor vehicles.

One of the objects of the present invention is to provide a novel power-operated steering mechanism for use in connection with motor vehicles whereby the mechanism is readily controlled in such a manner as to entail the expenditure of slight effort on the part of the operator.

Another object of the invention is to provide, in a vehicle steering mechanism of the power-operated type and embodying a fluid pressure-operated motor, a novel construction including a worm and nut mechanism for readily controlling the flow of fluid pressure to the motor under the control of the operator through the usual steering column.

A further object is to provide, in a construction of the above character, a built-in or integral type of control for the steering motor, the construction being such that the steering gear assembly and valve control may be easily manufactured and assembled as a unit.

Still another object is to provide, in a mechanism of the above type, a novel and compact arrangement of parts which, although embodying a compact construction, is yet capable of ready disassembly for the purpose of inspection or repair of the various component parts.

Other objects and novel features of the invention will appear more fully hereinafter from the following detailed description when taken in connection with the accompanying drawings illustrating several embodiments of the invention. It is to be expressly understood, however, that the drawings are designed for purposes of illustration only and are not to be taken as a definition of the limits of the invention, reference being had for this purpose to the appended claims.

In the drawings, wherein similar reference characters denote similar parts throughout the several views:

Fig. 1 is a side view, partly in section, of a steering mechanism embodying the principles of the present invention;

Fig. 2 is an axial sectional view taken along line 2—2 of Fig. 1;

Fig. 3 is a perspective view, partly in section, of a slightly modified form of the invention;

Fig. 4 is an axial sectional view of certain of the parts shown in Fig. 3, and

Fig. 5 is a transverse view, partly in section, of still another modified form of the invention.

Referring more particularly to Figs. 1 and 2, the present invention is illustrated therein as including a manually-operable steering column 6 operatively connected by means to be described hereinafter in detail to a drag link 7, the latter being suitably connected by mechanism not shown to the dirigible wheels of a vehicle.

The steering column 6 extends within and is rotatably mounted in a housing or casing 8 and has suitably connected thereto a worm 9 positioned in the housing and adapted to receive a nut 10. The latter is formed with slotted portions 11 for reception of the ends 12 of a lever 13, the end 14 of the latter surrounding and secured to a steering shaft 15 suitably rotatably mounted in a portion of the casing 8. As shown in Fig. 1, one end of lever 15 extends outwardly from the casing and has secured thereto one end of a pitman or steering arm 16, the lower end of which is connected to the drag link 7 by any suitable means.

For the purpose of effecting power operation of the steering arm 16 and the connections therefrom to the dirigible wheels of the vehicle, a suitable fluid pressure motor, such as double-acting cylinder 17, is provided having a piston 18 therein operatively connected as by means of piston rod 19 to the steering arm 16 at a point adjacent its lower end. A suitable valve mechanism 20 is provided for controlling the flow of fluid pressure to opposite ends of the cylinder 17, and preferably such valve mechanism is controlled by operation of the steering column 6 and is constructed in such a manner as to offer a resistance to operator-controlled movement of the steering column in a degree proportional to the power required for steering.

As shown, such valve means comprises similar valves 21 and 22 positioned exteriorly of the casing 8 but secured thereto as by means of screws 23. Referring more particularly to Fig. 1, the valve 21, for example, comprises a casing 24 having a pressure-responsive element or piston 25 therein dividing the casing into an exhaust chamber 26 and an intake chamber 27, the former communicating with the atmosphere through aperture 28, while the latter communicates with one end of the cylinder 17 through a conduit connection 29. Formed integrally with the piston 25 is an actuating stem 30 extending exteriorly of the valve casing, the piston being normally maintained in the position shown as by means of a spring 31.

A combined intake and exhaust valve assembly 32 is positioned in the casing 24 and includes an exhaust valve portion 33, normally spaced from a seat 34 formed in the piston 25, so as to establish communication between the chamber 27 and the exhaust opening 28 through a passage 35 in the piston. Said valve assembly is normally maintained in the position shown as by means of a spring 36, such normal position maintaining an intake valve portion 37 in contact with a seat 38 formed in the casing in order to close off communication between an intake chamber 39 and outlet chamber 27. It will be observed from the foregoing construction, however, that when the piston 26 is moved downwardly to effect contact between the seat 34 and the exhaust valve portion 33, further movement downwardly will effect opening of the intake valve portion 37 in order to supply fluid pressure from a reservoir 40 through a conduit 41 into chamber 39 and thence to chamber 27 through the open intake valve. Thus upon actuation of the valve stem 30, fluid pressure will be conducted to the cylinder 17 to effect power-operated movement of the steering arm 16.

In order to effect efficient manual control of the valves 21 and 22, the same are operated during combined movement of the nut 10 and worm 9 during initial movement of the steering column 6. As shown, this operation is secured by providing a lateral flange 42 on the nut which extends into a channel 43 formed in a rocker member 44, the latter being positioned within the casing 8 and suitably secured to a valve-operating rod 45 rotatably mounted in the walls of the casing. As will be observed from Fig. 1, the rod 45 is provided with an extension 46, exteriorly of the casing 8, and has secured thereto a rocker arm construction 47, each end of which is provided with adjustable screws 48 for operating the respective valve stems 30. With such an arrangement, referring to Fig. 2, movement of the rocker arm 47 in a clockwise direction to effect operation of valve 21 will serve to admit fluid pressure through conduit 29 to the left-hand end of cylinder 17, while counterclockwise movement of the rocker arm will operate valve 22 to supply fluid pressure to the right-hand end of cylinder 17 through conduit 49.

In operation and assuming that the steering column 6 is turned in the direction of the arrow a, Fig. 1, initial movement of the steering column will effect rotation of the worm 9 and nut 10 in unison. The nut is rotated by reason of the resistance offered by the connections 7, 16 and 13 which are directly connected to the dirigible wheels, and during such rotational movement of the nut, the rocker member 44 and shaft 45 will be rotated counterclockwise, as viewed in Fig. 2, to effect operation of valve 22. As will be apparent from this figure, the rotational movement of the nut 10 is limited when the sides of the rocker member 44 engage the casing 8. When valve 22 is operated, fluid pressure will be conducted to the right-hand end of cylinder 17 through conduit 49 to move drag link 7 to the left as well as moving arms 16 and 13 in a clockwise direction about the shaft 15 as a pivot, and the direction of the threads between the nut and the worm is such that such movement of the arms tends to return the nut 10 to a central neutral position such as that shown in Fig. 2. Thus, if the steering column 6 is held stationary after initial movement sufficient to effect operation of the valve mechanism 20, power operation of the steering mechanism will be effected to a degree proportional to such movement and the parts will then be returned to normal position, it being understood that the valves 21 and 22 are of the self-lapping type, that is are automatically moved to lapped position when pressure upon the actuating stems 30 is released, such movement being secured by reason of the fluid pressure exerted beneath the pistons 25 of the valves. It will also be observed, and this is one of the important features of the present invention, that the pressure of the fluid conducted to the cylinder 17 is at all times effective upon the piston 25 to oppose downward movement of the actuating valve stems 30 and thus through the shaft 45, rocker 44 and worm 10, the operator is constantly apprised of the power utilized for steering purposes through the reaction exerted by the pressure-responsive devices 25 in the valve mechanisms.

It will be understood that rotation of the steering column 6 in the opposite direction to that above described will effect operation of the valve 21 in such a manner as to admit fluid pressure to the left-hand end of cylinder 17 through conduit 29 to effect steering of the vehicle in the opposite direction. In steering in either direction, should the operator continue to apply a turning movement to the steering column with a force sufficient to maintain the nut away from its central position, it will be understood that the proper valve will be maintained in open position in order to continue to supply fluid pressure to the cylinder 17.

Referring to Figs. 3 and 4, a slightly modified form of the invention is shown therein, the main difference between this form and that heretofore described being in the arrangement of the valves controlling the flow of fluid pressure to the cylinder 17, and the operation of these valves by the nut 10. As shown, the nut 10 is provided with a lateral extension 42 as in the arrangement previously described, but the casing 8 in the present form is so formed as to permit the valves 50 and 51 to be arranged in opposed relation and to be directly actuated by the nut. Preferably, the casing 8 is provided at its upper portion with suitable openings for receiving valve-actuating stems 52 of the valves 50 and 51, and the construction is such that upon oscillation of the nut 10 in either direction, one or the other of the valve stems 52 will be operated to cause operation of the associated valve. The latter valves are constructed in a manner quite similar to the valves 21 and 22 heretofore described, and being duplicates of each other, only one will be described in detail.

Referring to Fig. 3, the valve 51, for example, is constituted by a casing 53 suitably secured as by means of screws 54 to the upper portion of the casing 8. Within the valve casing, there is provided a pressure-responsive element or piston 55 secured to the valve-actuating stem 52 and dividing the chamber defined by the casing into an exhaust chamber 56 and an outlet chamber 57, the former communicating with the atmosphere through port 58, while the latter is in constant communication with the right-hand end portion of the cylinder 17 through a conduit connection 59. As shown, the piston 55 is resiliently maintained in the position shown, as by means of a spring 60. A combined intake and exhaust valve assembly comprising intake and exhaust valve portions 61 and 62 respectively is positioned within the casing and is normally resiliently urged, as by means of a spring 63, to such a position that the intake valve portion 61 engages a seat 64, while the exhaust valve portion 62 is normally spaced from a seat 65 formed in the piston 55. Thus in normal position, the outlet chamber 57 communicates with the atmosphere through ports 66, 67 and 58, while communication between an inlet chamber 68, connected with a fluid pressure reservoir 69 through conduit 70, and outlet chamber 57 is interrupted. However, upon actuation of valve 51 by movement of the stem 52 thereof to the right, Fig. 3, contact between seat 65 and exhaust valve portion 62 will close off the exhaust of chamber 57 and additional movement of the stem will unseat the intake valve portion 61 to connect the right-hand end of cylinder 17 to the fluid pressure reservoir. Operation of valve mechanism 50 in like manner will connect the left-hand portion of cylinder 17 to the reservoir through conduit 71.

In operation of this form of the invention, rotation of the steering column 6 in the direction of the arrow b, for example, will serve to rock the nut 10 with the steering column during initial movement by reason of the resistance to steering offered by connections 7, 16, 15, 14 and 13. Upon rocking of the nut 10, flanged extension 42 thereon will effect operation of valve 51 to admit fluid pressure to the right-hand end of cylinder 17, such fluid pressure being effective to move piston 18 to the left to effect proper movement of the steering mechanism connected thereto. As in the form of the invention shown in Figs. 1 and 2, the valve mechanism 51 is of the reactive self-lapping type, and upon discontinuing rotation of the steering column, the pressure exerted beneath piston 55 of the valve mechanism will lap the latter and interrupt further flow of fluid pressure to the cylinder. Moreover, during power steering, fluid pressure beneath the piston 55 will exert a reaction upon the steering column proportional to the power required for steering.

It will be readily understood that rotation of the steering column in the opposite direction will initially effect operation of the valve 50 to supply fluid pressure to the left-hand end of the cylinder 17, whereupon power steering in the opposite direction is secured.

A slightly different form of valve mechanism is shown in Fig. 5 which may be employed with either of the arrangements heretofore described. The valve mechanism 72 shown herein is of the non-reactive follow-up type and is operable through the action of the nut 10 by means of a slidable bar 78. One end of the bar is provided with a pin 79 connected with a slide valve 73 housed within a suitable casing and adapted, when in normal position, to close ports 74 and 75 leading to the power steering cylinder. The casing for the valve is provided with an inlet connection 76 connected with a reservoir of fluid pressure, while an atmospheric connection 77 is provided in the casing 8, the construction being such that when valve 73 is moved to the left, for example, to connect passages 75 and 76, passage 74 will communicate with the atmosphere through connection 77. Suitable resilient means, such as spring 81, is provided for maintaining valve 73 in fluid-tight engagement with its seat.

In operation of this form of the invention, initial rotation of the steering shaft 6 in either direction will serve to connect either passages 74 or 75 with the intake 76 and thus power steering will be effected as in the forms heretofore described. Upon arresting movement of the steering column 6, continued movement of the fluid motor will, through the steering arm 16 and connections between the latter and the nut, move the latter to its normal central position as shown in Fig. 5, thus lapping the valve mechanism 72.

While several forms of the invention have been illustrated and described herein, it will be understood that the same is not limited thereto but may be embodied in various forms, as well understood by those skilled in the art. Reference will, therefore, be had to the appended claims for a definition of the limits of the invention.

What is claimed is:

1. The combination with a steering column and a drag link of a motor vehicle steering mechanism, of means for operatively connecting said column and link for combined manual and power operation of the latter comprising a casing, a worm rotatably mounted in the casing, means connecting said worm and column, a nut surrounding said worm, a steering shaft rotatably mounted in the casing, means connecting said nut and shaft whereby the latter may be rotated by movement of the nut along the worm, a pitman arm connected at one end with said shaft and extending exteriorly of said casing, means connecting the other end of said arm with said drag link, a double-acting fluid pressure-operated cylinder having a piston operatively connected with said pitman arm exteriorly of the casing, a pair of valves for respectively controlling the flow of fluid pressure to opposite ends of said cylinder, said valves being secured to said casing exteriorly thereof, and means for selectively operating said valves upon initial movement of the steering column in either direction comprising a valve-operating shaft rotatably mounted in said casing and having one end extending through the casing, a rocker arm secured to said shaft end and adapted to operate one or the other of said valves, depending upon the direction of rotation of said valve-operating shaft, and means connecting the nut and last named shaft for rocking the latter upon initial movement of said steering column and worm.

2. The combination with a steering column and a drag link of a motor vehicle steering mechanism, of means for operatively connecting said column and link for combined manual and power operation of the latter comprising a casing, a worm rotatably mounted in the casing, means connecting said worm and column, a nut surrounding said worm, a steering shaft rotatably mounted in the casing, means connecting said nut and shaft whereby the latter may be rotated by movement of the nut along the worm, a pitman arm connected at one end with said shaft exteriorly of said casing, means connecting the other end of said arm with said drag link, a double-acting fluid pressure-operated cylinder having a piston operatively connected with said pitman arm exteriorly of the casing, a pair of valves for respectively controlling the flow of fluid pressure to opposite ends of said cylinder, said valves being secured to said casing exteriorly thereof, and means for selectively operating said valves upon initial movement of the steering column in either direction comprising a pair of valve-actuating rods slidably mounted in said casing, and means operatively connecting the rods and said nut for respectively reciprocating the former upon initial movement of said steering column and worm.

3. The combination with a steering column and a drag link of a motor vehicle steering mechanism, of means for operatively connecting said column and link for combined manual and power operation of the latter comprising a casing, a worm rotatably mounted in the casing, means connecting said worm and column, a nut surrounding said worm, a steering shaft rotatably mounted in the casing, means connecting said nut and shaft whereby the latter may be rotated by movement of the nut along the worm, a pitman arm connected at one end with said shaft exteriorly of said casing, means connecting the other end of said arm with said drag link, a double-acting fluid pressure-operated cylinder having a piston operatively connected with said pitman arm exteriorly of the casing, a pair of valves for respectively controlling the flow of fluid pressure to opposite ends of said cylinder, said valves being secured to said casing exteriorly thereof, and means for selectively operating said valves upon initial movement of the steering column in either direction comprising a reciprocable valve-actuating rod for each valve, and means including an outwardly-extending flange formed on said nut and extending lengthwise thereof for operatively connecting the nut and said valve-operating rods whereby the latter are selectively operated upon initial movement of said steering column and worm.

4. In a vehicle steering mechanism having a drag link connected with wheels to be steered, a steering column, a housing, a worm connected with the steering column and rotatable therewith in said housing, a nut surrounding said worm and mounted for limited movement therewith, a pivoted steering arm operatively connected with said nut and having an end positioned exteriorly of said housing and connected with the drag link, a fluid motor having a piston connected with said arm adjacent said end, and valve means operable by said nut during said limited movement of the latter with the worm during initial movement of the steering column for controlling the flow of fluid pressure to said motor, said valve means including a pressure-responsive element subjected to the pressure of the fluid conducted to said motor and operatively connected with said nut for opposing operation of the latter to operate said valve means to a degree proportional to the power required for steering.

5. In a vehicle steering mechanism having a drag link connected with wheels to be steered, a steering column, a housing, a worm connected with the steering column and rotatable therewith in said housing, a nut surrounding said worm, a pivoted steering arm operatively connected with said nut and having an end positioned exteriorly of said housing and connected with the drag link, a double-acting fluid motor having a piston connected with said arm adjacent said end, valve means operable during initial movement of the steering column for controlling the flow of fluid pressure to said motor, said valve means including a pressure-responsive element subjected to the pressure of the fluid conducted to said motor for opposing operation of the steering column to operate said valve means to a degree proportional to the power required for steering, and means including a lateral extension provided on said nut for operating said valve means.

6. In a vehicle steering mechanism having a drag link connected with wheels to be steered, a steering column, a housing, a worm connected with said steering column and rotatable in said housing, a nut surrounding said worm, a pivoted steering arm operatively connected with said nut and having an end positioned exteriorly of said housing and connected with the drag link, a double-acting fluid motor having a piston connected with said arm adjacent said end, valve means for controlling the flow of fluid pressure to said motor, and means including a lateral extension on said nut for operating said valve means during movement of said nut and worm in unison, said casing being formed as a stop means to limit movement of said nut with said worm, said valve means including a pressure-responsive element subjected to the pressure of the fluid conducted to said motor and operatively connected with said extension to oppose valve-operating movement of said nut to a degree proportional to the power required for steering.

WILFRED A. EATON.